June 5, 1934. C. H. HALL 1,961,214
AIRCRAFT PROPELLER COWLING
Filed July 26, 1932
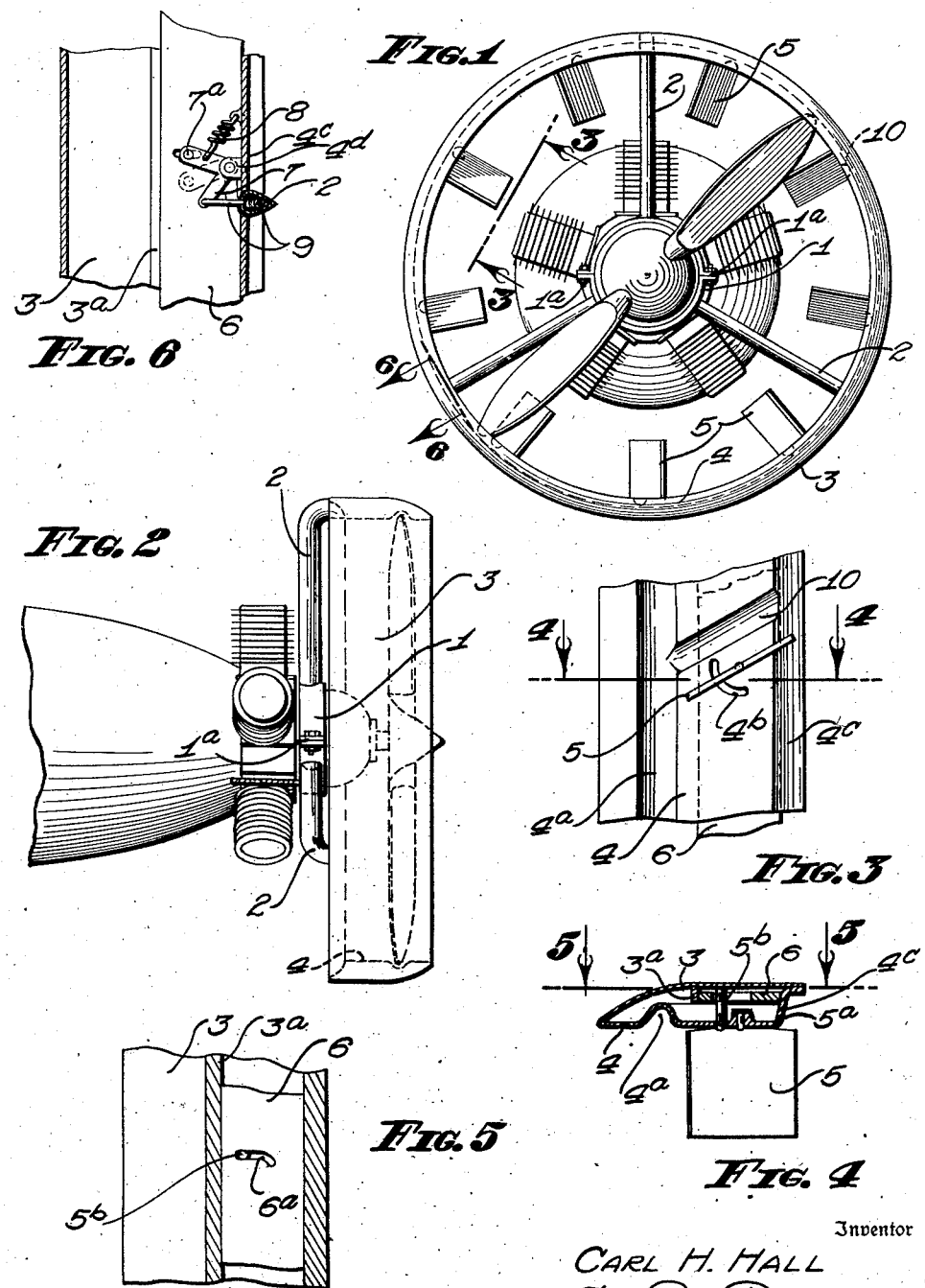
Inventor
CARL H. HALL
By A. B. Bowman
Attorney Patented June 5, 1934

1,961,214

UNITED STATES PATENT OFFICE 1,961,214

AIRCRAFT PROPELLER COWLING

Carl H. Hall, San Diego, Calif.

Application July 26, 1932, Serial No. 624,692

8 Claims. (Cl. 170—168)

My invention relates to a cowling for aircraft propellers, and the objects of my invention are:

First, to provide a cowling for aircraft propellers which regulates and controls the thrust of air from the propeller, thus facilitating the control of the aircraft;

Second, to provide a cowling for aircraft propellers in which there are provided angular air conducting means back of the propeller blades for receiving the air from the blades for increasing the efficiency of the thrust of the aircraft propeller blades;

Third, to provide a device of this class in which the angular means back of the propeller blades are shiftable manually to aid in the control of the aircraft;

Fourth, to provide a cowling of this class in which the angular means may be shifted to a plane in alinement with the plane of revolution of the propeller to provide an aid in stopping the aircraft, and provide a safe landing, and Fifth, to provide an aircraft propeller cowling of this class which is very simple and economical of construction, durable, easy to operate, efficient in its action and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a front elevational view of my aircraft propeller cowling showing it mounted in position on an aircraft engine with the propeller in position; Fig. 2 is a side elevational view thereof and showing a fragmentary portion of an airplane fuselage; Fig. 3 is an enlarged fragmentary rear view from the line 3—3 of Fig. 1; Fig. 4 is a sectional view through 4—4 of Fig. 3; Fig. 5 is a sectional view of a fragmentary portion shown from the line 5—5 of Fig. 4, and Fig. 6 is an enlarged fragmentary sectional view through 6—6 of Fig. 1.

Similar characters of reference refer to similar parts and portions throughout the several views of the drawing.

Clamp band 1, arms 2, outer body portion 3, inner body portion 4, blades 5, blade operating band 6, bell crank 7, spring 8, cable 9, and angular grooves 10, constitute the principal parts and portions of my propeller cowling structure.

The aircraft engine and propeller may be of any conventional type and secured on the front extended portion of the engine is the clamp bend 1 by means of bolts 1a for securing it rigidly to the engine. Secured to this clamp band 1 are a plurality of arms 2, in this case I have shown three although there may be any number as desired, extending outwardly and on the outer ends of which is mounted a housing consisting of the outer member 3 and inner member 4. The outer member 3 is an annular member curved inwardly at its front side, as shown best in Fig. 4 of the drawing. The inner member 4 is also an annular member spaced from the outer member 3 forming a hollow housing, as shown best in Fig. 4 of the drawing. This inner member 4 is provided with an annular groove 4a in its inner surface in which the tips of the propellers may revolve if desired, as shown in Figs. 1 and 2 of the drawing. Extending backwardly on an angle from this groove 4a are a plurality of angular grooves 10 which tend to bleed air from the groove 4a and reduce the whirling action of the air. Pivotally mounted on the inner side of the member 4 are a plurality of blades 5 by means of journal members 5a so they are adapted to rotate slightly therein. These blades 5 are also provided with pins 5b which are secured to the blades a short distance from the member 5a and extend out through slots 4b in the member 4 which slots are on an arc from the pivotal mounting of the blade 5. These members 5b are for the purpose of shifting or feathering the blades 5 as its ends are mounted in slots 6a in the band 6 so that when the band 6 is shifted in the housing between the members 3 and 4 these blades 5 are feathered or turned upon their pivotal axes 5a. It will be here noted that these blades 5 are preferably mounted in close relation to the grooves 10 in the member 4.

The band 6 is adapted to shift longitudinally in either direction and is supported on the one side by a ridge 3a on the member 3 and at its other edge by the outwardly turned portion 4c of the member 4, as shown best in Fig. 4 of the drawing. This band 6 is shifted by means of a bell crank 7 which has a pin 7a extending from one side fitted to a transverse slot in the band 6. Said bell crank is pivotally mounted on the portion 4c of the member 4 by means of lugs 4d.

This bell crank is provided with a spring 8 tending to hold it in a backward relation at all times. To the other end of the bell crank 7 is mounted a cable 9 which extends down through one of the arms 2 and to the cockpit of the fuselage of the aircraft for providing means for shifting the band 6 in one direction, while the spring 8 tends to draw it in the opposite direction, thus providing means for shifting the blades 5 to various angular positions so that the blades 5 may be moved from a position in alinement with the revolution of the propeller blades or a right angle thereto, or may be positioned at any angle between these two positions, as desired, for obtaining the best results and efficiency in the propeller thrust and control of the aircraft. It being noted, that when it is desired to land, these blades may be brought to a position in alinement with the revolution of the propeller blades and thus provide means for checking the advance of the airplane in landing.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an aircraft propeller cowling, the combination with an engine and propeller with blades of an annular housing, means for securing said housing to the engine at the outer side of the propeller blades, a plurality of feathering blades mounted on the inner side of said housing back of said propeller blades, and means shiftably mounted in said housing engageable with said feathering blades for feathering the same.

2. In an aircraft propeller cowling, the combination with an engine and propeller with blades of an annular housing, means for securing said housing to the engine at the outer side of the propeller blades, a plurality of feathering blades mounted on the inner side of said housing back of said propeller blades, means shiftably mounted in said housing engageable with said feathering blades for feathering the same, and a plurality of angularly disposed grooves positioned in said housing in cooperative relation with said blades.

3. In an aircraft propeller cowling, the combination with an engine and propeller with blades of an annular housing, means for securing said housing to the engine at the outer side of the propeller blades, a plurality of feathering blades mounted on the inner side of said housing back of said propeller blades, means shiftably mounted in said housing engageable with said feathering blade for feathering the same, consisting of a band mounted in said housing, a bell crank with one arm in operative relation therewith and a cable in connection with the other arm of said bell crank.

4. In an aircraft propeller cowling, the combination with a fuselage with a cockpit, an engine and propeller with blades of a housing secured to the engine and positioned around the outer path of the propeller blades, a plurality of feathering blades mounted on the interior of said housing back of the path of said blades, and means cooperating with said feathering blades and extending to the cockpit of the fuselage to facilitate the manual feathering of said blades.

5. In an aircraft propeller cowling, the combination with a fuselage with a cockpit, an engine and propeller with blades of a housing secured to the engine and positioned around the outer path of the propeller blades, a plurality of feathering blades mounted on the interior of said housing back of the path of said blades, means cooperating with said feathering blades and extending to the cockpit of the fuselage to facilitate the manual feathering of said blades, and a plurality of angular grooves on the inner surface of said cowling in cooperative relation with said feathering blades.

6. In a propeller cowling apparatus wherein there is a propeller with blades, the combination with said propeller of an annular housing member supported around the outer side of the propeller blades and provided with an annular groove on its inner surface to receive the tips of said propeller blades, and a plurality of grooves each intersecting said groove and extending backwardly therefrom at an angle.

7. In a propeller cowling apparatus wherein there is a propeller with blades, the combination with said propeller of an annular housing member supported around the outer side of the propeller blades and provided with an annular groove on its inner surface to receive the tips of said propeller blades, a plurality of grooves each intersecting said groove and extending backwardly therefrom at an angle, and a plurality of feathering blades pivotally mounted on the inner surface of said cowling in cooperative relation with each of said grooves.

8. In a propeller cowling apparatus wherein there is a propeller with blades, the combination with said propeller of an annular housing member supported around the outer side of the propeller blades and provided with an annular groove on its inner surface to receive the tips of said propeller blades, a plurality of grooves each intersecting said groove and extending backwardly therefrom at an angle, a plurality of feathering blades pivotally mounted on the inner surface of said cowling in cooperative relation with each of said grooves, and means mounted in said cowling in connection with said feathering blades for simultaneously feathering the same.

CARL H. HALL.